(12) United States Patent
Dittrich

(10) Patent No.: US 9,467,860 B2
(45) Date of Patent: *Oct. 11, 2016

(54) WIRELESS SECURITY CONFIGURATION

(71) Applicant: SAP SE, Walldorf (DE)

(72) Inventor: Wolfgang Dittrich, Heidelberg (DE)

(73) Assignee: SAP SE, Walldorf (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/261,816

(22) Filed: Apr. 25, 2014

(65) Prior Publication Data

US 2014/0226819 A1    Aug. 14, 2014

Related U.S. Application Data

(63) Continuation-in-part of application No. 13/455,989, filed on Apr. 25, 2012.

(30) Foreign Application Priority Data

Apr. 18, 2013  (EP) ................................ 13164331

(51) Int. Cl.
*H04W 12/08* (2009.01)
*G06F 21/36* (2013.01)
(Continued)

(52) U.S. Cl.
CPC .............. *H04W 12/08* (2013.01); *G06F 21/36* (2013.01); *G06F 21/43* (2013.01); *G06F 21/44* (2013.01);
(Continued)

(58) Field of Classification Search
CPC ...... G06F 21/00; G06F 21/30; G06F 21/305; G06F 21/34; G06F 21/35; G06F 21/42; G06F 21/43; G06F 21/44; G06F 2221/2112; H04L 9/00; H04L 9/08; H04L 9/32; H04L 9/321; H04L 9/3226; H04L 9/3228; H04L 2209/80; H04L 63/00; H04L 63/06; H04L 63/067; H04L 63/08
See application file for complete search history.

(56) References Cited

U.S. PATENT DOCUMENTS 6,654,480 B2 * 11/2003 Rhoads .................... H04N 5/90
                                                    380/252
6,737,957 B1 * 5/2004 Petrovic ................ G10L 19/018
                                                    340/5.86

(Continued)

FOREIGN PATENT DOCUMENTS

DE    EP 2385480 A1 * 11/2011 .......... H04M 1/2755
EP    2 107 509      10/2009
EP    2 385 480 A1   11/2011

OTHER PUBLICATIONS

Steeman, Jeroen, "QR code Generator—Wifi Access" [Online], Apr. 12, 2011 [Retrieved on: Aug. 6, 2015], Retrieved from: <http://web.archive.org/web/20110412141212/http://blog.qr4.nl/QR-Code-WiFi.aspx >.*

(Continued)

*Primary Examiner* — Eric W Shepperd
(74) *Attorney, Agent, or Firm* — Jones Day

(57) ABSTRACT

An apparatus, method and computer-readable storage medium to efficiently connect to wireless access point(s). An electronic device may capture coded information. The coded information may include a security key to connect to a wireless access point, and the coded information may be an image, an audio clip, text, or a video. The coded information may be steganographically encoded. The coded information may be captured from a display of a second electronic device. The second electronic device may include the wireless access point.

17 Claims, 5 Drawing Sheets

(51) Int. Cl.
*G06F 21/44* (2013.01)
*H04W 12/04* (2009.01)
*G06F 21/43* (2013.01)
*H04W 84/12* (2009.01)

(52) U.S. Cl.
CPC ...... *H04W 12/04* (2013.01); *G06F 2221/2123* (2013.01); *G06F 2221/2129* (2013.01); *H04W 84/12* (2013.01)

(56) References Cited

U.S. PATENT DOCUMENTS

| | | | |
|---|---|---|---|
| 8,115,819 B2 | 2/2012 | Anderson | |
| 8,297,510 B1* | 10/2012 | Yakshtes | H04L 9/3247 235/462.1 |
| 8,576,773 B2 | 11/2013 | Pendakur | |
| 2006/0117174 A1 | 6/2006 | Lee | |
| 2006/0233420 A1* | 10/2006 | Rhoads | G06F 17/30876 382/100 |
| 2008/0123899 A1* | 5/2008 | Rhoads | G06F 17/30876 382/100 |
| 2009/0116066 A1 | 5/2009 | Nishitani | |
| 2010/0008508 A1* | 1/2010 | Girao | H04L 9/0841 380/278 |
| 2010/0138321 A1* | 6/2010 | Rathbun | G06Q 10/087 705/28 |
| 2010/0262828 A1* | 10/2010 | Brown | H04L 9/0844 713/171 |
| 2011/0150266 A1 | 6/2011 | Hohndel | |
| 2011/0311042 A1* | 12/2011 | Cheddad | G06F 21/602 380/28 |
| 2011/0314299 A1 | 12/2011 | Lee | |
| 2012/0252405 A1 | 10/2012 | Lortz et al. | |
| 2012/0284782 A1 | 11/2012 | Karim et al. | |
| 2013/0228615 A1* | 9/2013 | Gates | G06F 3/002 235/375 |

OTHER PUBLICATIONS

The How-To Geek, "Is Hiding Your Wireless SSID Really More Secure?" [Online], Sep. 13, 2010 [Retrieved on: Aug. 15, 2016], www.lifehacker.com, Retrieved from: < http://lifehacker.com/5636856/is-hiding-your-wireless-ssid-really-more-secure >.*

Steeman, Jeroen, "QR Code Generator—WiFi Access," Apr. 12, 2011, XP055083883, retrieved from the Internet: URL:http://web.archive.org/web/20110412141212/http://blog.qr4.nl/QR-Code-WiFi.aspx (retrieved on Oct. 14, 2013), the whole document.

Extended European Search Report, dated Oct. 29, 2013, from corresponding EP application No. 13164331.4.

Decorating a QR Code-Part Two, Aug. 4, 2011, http://qrworld.wordpress.com/2011/08/04/decorating-a-qr-code, 6 pages.

* cited by examiner

WIRELESS SECURITY CONFIGURATION

CROSS-REFERENCE TO RELATED APPLICATIONS

This application is a continuation-in-part application of U.S. patent application Ser. No. 13/455,989, filed Apr. 25, 2012, the entire contents of which is expressly incorporated herein by reference thereto. This application claims priority to European Patent Application No. 13164.331.4, filed Apr. 18, 2013, the entire contents of which is expressly incorporated herein by reference thereto.

BACKGROUND

Using an electronic device (e.g., a mobile device) to wirelessly access a network such as the Internet typically entails connecting the device to a wireless access point (WAP) which is in turn connected to the network. To prevent unauthorized devices from connecting to the WAP, the WAP may be password protected. Specifically, the device attempting to connect to the WAP may have to supply a valid security key to connect to the WAP. Currently, a user utilizes the device attempting to connect to the WAP to scan for available WAPs in the vicinity and selects a particular WAP to connect to. The device may then prompt the user to enter the security key for that WAP. If the user enters the correct security key, the device may then connect to the WAP to attain access to the corresponding network.

This current approach can be problematic since the user has to either 1) type in the security key manually, or 2) copy the key onto an Universal Serial Bus (USB) drive and plug the USB drive into a USB port of the device attempting to connect to the WAP. Given that current security protocols such as Wi-Fi Protected Access (WPA) require long security keys, typing in the security key manually is cumbersome and error prone. Further, using a USB drive can be problematic since the device may not have a USB port and/or users may not have easy access to a USB drive.

SUMMARY OF THE INVENTION

A method to connect a device wirelessly to a network, a method of coding information including a security key for connecting a device to a wireless access point, a corresponding apparatus and a corresponding non-transitory computer-readable medium as specified in the independent claims are provided. Embodiments are given in the dependent claims. If not explicitly stated otherwise, the features of different embodiments can be freely combined with and without each other.

In embodiments, a computer-implemented method is provided to connect a device wirelessly to a network. The method includes capturing coded information, wherein the coded information includes a security key. The security key is required in order to connect the device to a wireless access point, and the coded information is at least one of an image, a text, an audio clip, and a video. For example, the coded information can contain a key having both an image and a text. The method further includes decoding the coded information to obtain the security key and using the obtained security key to connect the device to the wireless access point.

Embodiments of the present invention are advantageous because highly complex, and thus, more secure, secret keys can be used and can easily be entered into the device without using a security token or a USB-stick. Further, for example, the USB-stick itself might pose a security risk due to the danger of malware infecting a system upon connection of the USB stick and/or misappropriation of the USB-stick by a third party. Thus, the burden of a user interacting with the device for connecting the device to the network is reduced and the security is increased as longer, dynamic, and/or more complex secret keys can be used.

In embodiments, the installation and configuration of a wireless network is greatly facilitated and may be executed fully automatically once a user has captured the coded information via an appropriate sensor of the device.

In embodiments, the coded information is captured and the secret key is decoded and used for connecting the device to the WAP in a fully automated manner. This increases the speed of connecting to the network compared to the manual entry of the secret key and is also more secure as the user does not have to memorize the secret key or writedown the secret key, thus, causing a potential security breach, since the secret key may be long and complex.

In embodiments, the coded information is a Quick Response (QR) code. In embodiments, the coded information is a uni- or multi-dimensional code.

In embodiments, the coded information is captured from one of a display of an electronic device and an audio output of the electronic device. Capturing from a display or an audio output is advantageous as the coded information may vary over time and may be used for different purposes and corresponding application programs.

In embodiments, the electronic device includes a wireless access point. For example, a smart phone includes a WAP for connecting to a mobile phone network. The smart phone can, in addition, include a camera for capturing the coded information from, for example, a printout, a configuration sheet, or a screen of another device.

In embodiments, the coded information is an image and the coded information is captured from, for example, a configuration sheet. In embodiments, the coded information is an image and a text and is captured from, for example, a configuration sheet, a screen, or other location.

According to embodiments, the coded information hides the secret key within other data, and the secret key is encoded using a steganographic algorithm. For example, the coded information is a steganographic image including the secret key as a "hidden" watermark. Hiding the secret key is advantageous as the mere existence of a secret code or a "secret" is hidden from prying eyes, thus further increasing the security of the method.

In embodiments, the wireless access point is secured by at least one of Wi-Fi Protected Access, Wi-Fi Protected Access II, and Wired Equivalent Privacy. In embodiments, access to the WAP is only granted to devices which are operable to authenticate themselves via the secret key.

In embodiments, the coded information includes an identifier identifying the wireless access point. The identifier is advantageous because once the device has captured the coded information including the secret key and the identifier of the WAP, in embodiments, the device can connect to the identified WAP in a fully automated manner. Thus, the time and effort necessary for setting up a network, e.g., a Wireless Local Area Network (WLAN) at home, can be reduced significantly.

Embodiments of the present invention relate to a computer-implemented method including coding information including a security key, wherein the security key is required to connect to a wireless access point and the coded information is at least one of an image, an audio clip, text, and a video. The method further includes at least one of a)

displaying the coded information on a display of an electronic device and b) playing the coded information via at least an audio speaker of the electronic device.

In embodiments, the coded information is generated by taking the secret key as input in the form of plain text, such that the coded information, e.g., an image, an audio clip, text, and/or a video, includes the secret key in a non-human-readable form. In embodiments, the coded information is created by applying at least one steganographic algorithm on the secret key and/or on some additional data such as an image wherein the secret key is to be hidden. The coded information provides for a secure way of providing an access key to a device for enabling the device to connect to a WAP. For example, even if an unauthorized person obtains possession of the coded information, that unauthorized person will not be able to extract or memorize the secret key, as may have been possible in earlier systems. The unauthorized person would only be able to connect the device to the WAP if, for example, the unauthorized person was in possession of the coded information and in possession of the device running the corresponding decoding algorithm, among other things.

Embodiments of the present invention relate to an apparatus including at least one of a camera and a microphone to capture coded information, wherein the coded information includes a security key to connect to a wireless access point, and the coded information is at least one of an image, an audio clip, a text, and a video. The apparatus further includes a processor for executing computer instructions. The processor is configured to decode the coded information to obtain the security key, and to use the obtained security key to connect to the wireless access point.

Embodiments of the present invention relate to an apparatus including a processor for executing computer instructions, the processor configured to code information including a security key, wherein the security key is required to connect to a wireless access point and the coded information is at least one of an image, an audio clip, a text, and a video. The apparatus further includes at least one of a) a display to display the coded information and b) at least an audio speaker to play the coded information.

Embodiments of the present invention relate to a non-transitory computer-readable medium embodied with computer-executable instructions for causing a computer to execute instructions, the computer instructions include capturing coded information, wherein the coded information includes a security key to connect to a wireless access point, and the coded information is at least one of an image, an audio clip, a text, and a video. The instructions further include decoding the coded information to obtain the security key, and using the obtained security key to connect a device to the wireless access point.

DETAILED DESCRIPTION

Embodiments herein may be discussed in systems to efficiently connect to wireless access point(s). An electronic device may capture coded information. The coded information may include a security key to connect to a wireless access point, and the coded information may be an image, an audio clip, text, or a video. In embodiments, the coded information may be a Quick Response Code. In embodiments, the coded information may be captured from a display of a second electronic device. In embodiments, the second electronic device may include the wireless access point. In embodiments, the coded information may be an image and the coded information may be captured from a configuration sheet. In embodiments, the wireless access point may be secured by one of Wi-Fi Protected Access, Wi-Fi Protected Access II, and Wired Equivalent Privacy. In embodiments, the coded information may include an identifier identifying the wireless access point.

In embodiments, an electronic device may code information including a security key. The security key may be required to connect to a wireless access point and the coded information may be an image, an audio clip, text, or a video. The electronic device may display the coded information on a display of the electronic device.

The term "capturing" information, e.g., a code, as used herein relates to any kind of automatically receiving said information by a device. Depending on the medium having the information, the capturing may include taking an image by an optical sensor (e.g., a camera), recording a sound or a noise by an acoustic sensor (e.g., a microphone) or other available methods/devices. The capturing of the information may be executed passively by a sensor receiving some form of signal/transmission or may include the stimulation of an emission of a signal including the information. For example, the capturing device may illuminate the medium having the information for enabling its camera to capture the reflected light.

The expression "coded information" as used herein encompasses any kind of data including, in encoded form, some information which needs to be protected from unauthorized access. The coded information may be a security key.

The expression "security key" as used herein relates to data which enables a device to connect to a wireless access point, wherein any device not being in possession of the security key is prohibited from accessing the wireless access point and thus is prohibited from accessing the network.

The expression "wireless access point" (WAP) as used herein relates to a device that allows wireless devices to connect to a wired network using, for example, Wi-Fi or related standards. The WAP may, e.g., connect to a router (e.g., via a wired network) if it is a standalone device, or may be part of a router itself. A WAP may be, for example, a Linksys "WAP54G" 802.11g Wireless Access Point.

Figure 1:
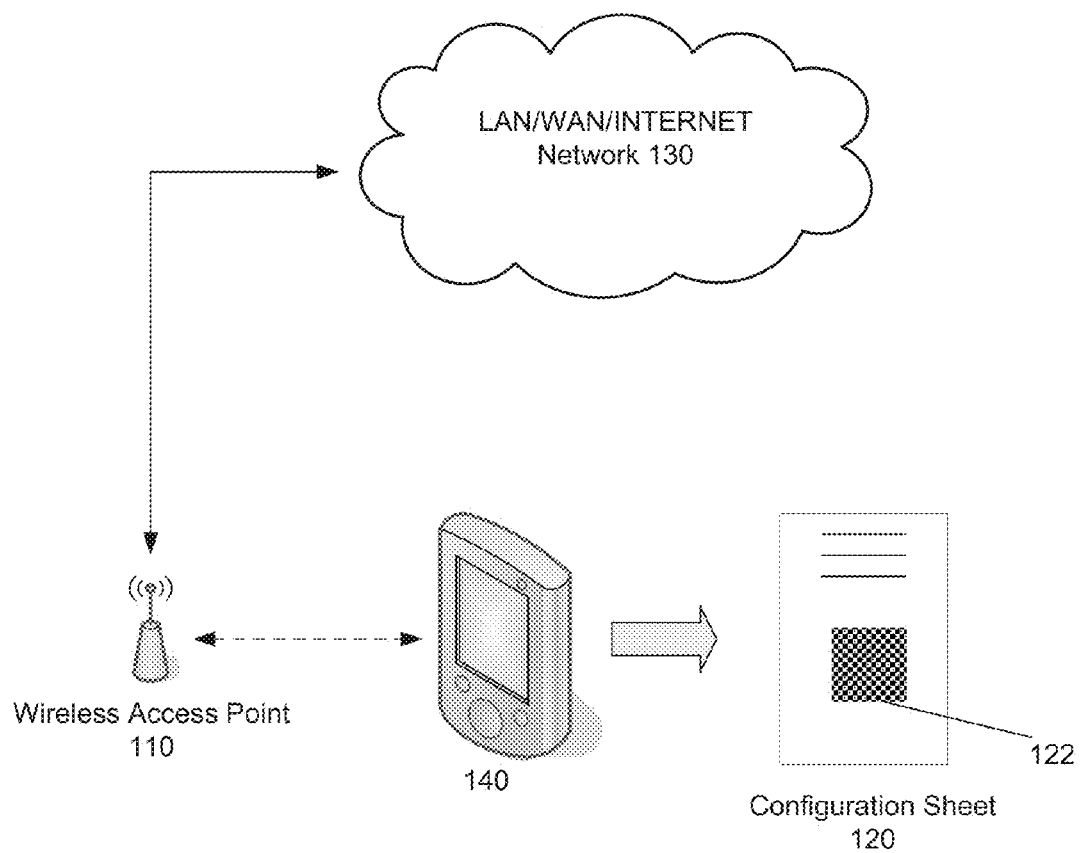
FIG. 1 illustrates a device connected to a WAP according to an embodiment.

FIG. 1 illustrates a device connected to a WAP according to an embodiment. A WAP 110 may be connected to a network 130 such as a wide area network (WAN), a local area network (LAN), or the Internet. A device 140 may connect to the WAP 110 to access the network 130. For example, the WAP 110 may include built-in security to only allow authorized devices to connect to the WAP 110. For example, a security key (or password) may be required to connect to the WAP 110. The device 140 may acquire the security key required to connect to the WAP 110 from a configuration sheet 120. After acquiring the security key from the configuration sheet 120, the device 140 may supply the security key to the WAP 110 in order to gain access to the network 130.

In embodiments, the device 140 may acquire the security key required to connect to the WAP 110 by capturing one or more images 122 from the configuration sheet 120. The image 122 may encode the security key based on a predetermined protocol. In an embodiment, the protocol may be a standardized protocol. For example, image 122 may be a Quick Response Code (QR Code), which is a type of matrix bar code with a large storage capacity. A standard QR Code can encode up to 7,089 characters of numeric data, up to 4,296 alphanumeric characters of data, or up to 2,953 8-bit bytes of data.

In embodiments, based on the predetermined protocol, the device 140 may include component(s) to capture and decode the coded information (i.e., the security key) in image 122. In embodiments, the captured coded information may be transferred to a component which decodes the coded information to obtain the security key. In embodiments, the component capturing the coded information and the component decoding the coded information may be a single component. In embodiments, the component(s) capturing/decoding the coded information may include hardware, software, or a combination of both hardware and software. For example, device 140 may be a mobile phone. The mobile phone 140 may capture image 122 via a built-in camera. An application installed in mobile phone 140 may then retrieve the coded information from the captured image 122 and decode the coded information to obtain the security key required for connecting to WAP 110.

In embodiments, WAP 110 may initially be protected by a default security key selected by the manufacturer or seller of the WAP 110. The format of the default security key may depend on the security protocols available on WAP 110. For example, the WAP 110 may employ Wi-Fi Protected Access II (WPA2) as the security protocol. Since a WPA2 security key may be long and hard to remember, the manufacturer may include a configuration sheet 120 to provide convenient and secure access to WAP 110. The configuration sheet 120 may include an image 122, which is a coded representation of the initial default security key. For example, the configuration sheet 120 may include a QR Code representing the security key. In an embodiment, the image 122 may be printed on the WAP 110 itself. The user of WAP 110 may scan/capture the QR Code 122 using a device 140 such as a mobile phone. Device 140 may decode QR Code 122 to obtain the security key and connect to WAP 110.

In embodiments, access to WAP 110 may be a service that a seller desires to selectively provide to paying customers. In another embodiment, access to WAP 110 may be a service that a seller desires to provide to customers who purchase another product. For example, it is common for coffee shops to provide wireless Internet access (through WAP 110) to individuals who are within the vicinity of the coffee shop. The coffee shop may want to selectively limit the Internet access to customers who purchase a product, such as a coffee, from the coffee shop. In an embodiment, the coffee shop may do so by password protecting the WAP 110 of the coffee shop, and providing the password through an image 122, such as a QR Code, printed on the receipt (a type of configuration sheet 120) of each coffee purchase. In another embodiment, the QR Code 122 may be printed on any material bundled with the coffee including the coffee cup, the coffee cup insulator, etc.

Figure 2:
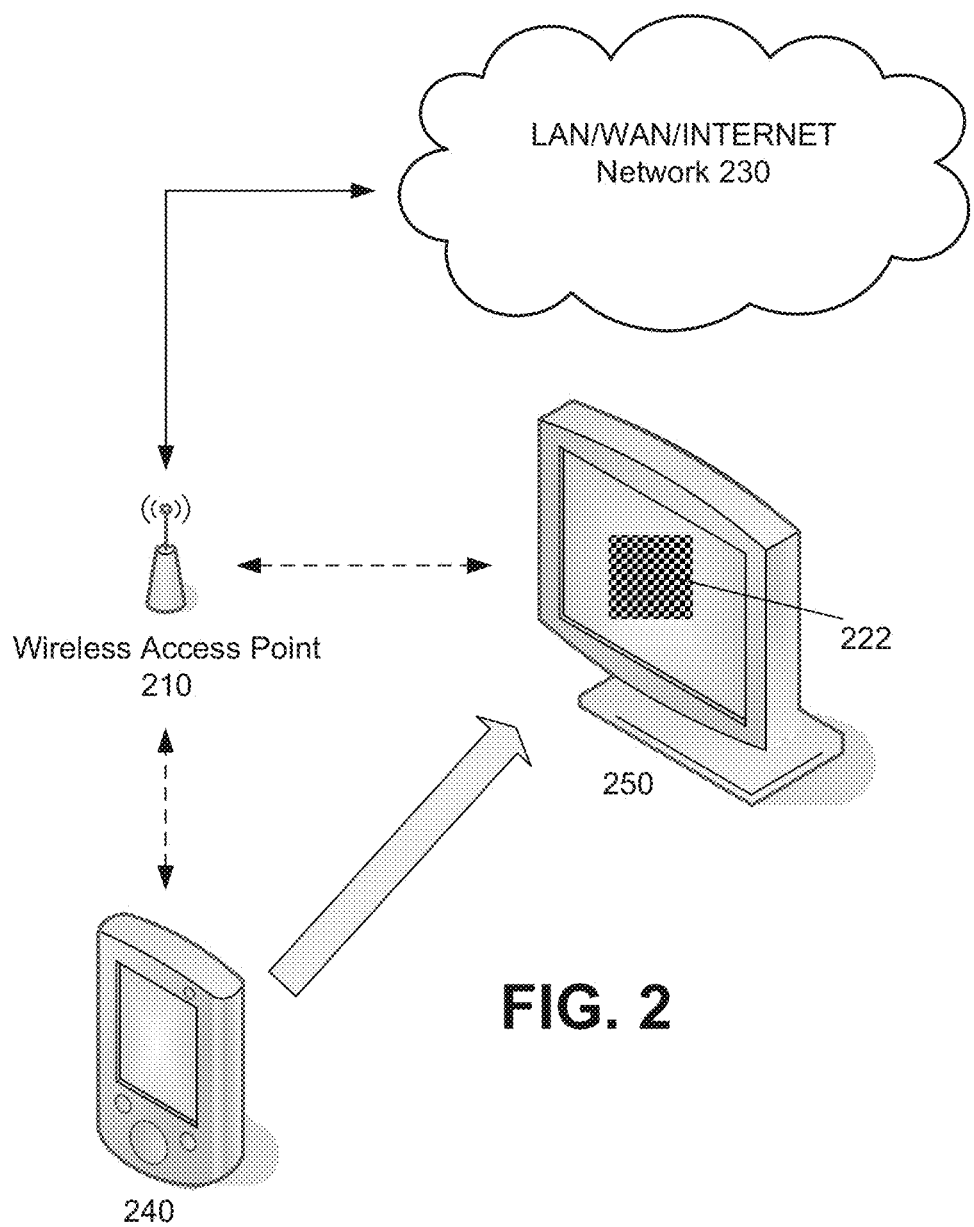
FIG. 2 illustrates a device connected to a WAP according to an embodiment.

FIG. 2 illustrates a device connected to a WAP according to an embodiment. A WAP 210 may be connected to a network 230 such as a WAN, LAN, or the Internet. A first device 240 may connect to the WAP 210 to access the network 230. Typically, the WAP 210 may include built-in security to only allow authorized devices to connect to the WAP 210. For example, a security key (or password) may be required to connect to the WAP 210. In an embodiment, a second device 250 may have access to the security key needed to connect to WAP 210. The first device 240 may acquire the security key required to connect to the WAP 210 from the second device 250. After acquiring the security key from the second device 250, the first device 240 may supply the security key to the WAP 210 in order to gain access to the network 230.

In embodiments, the first device 240 may capture coded information 222 from the second device 250, and decode the coded information 222 to obtain the security key required to connect to the WAP 210. The coded information 222 may be an image(s), audio, text, and/or video. The coded information 222 may convey the security key based on a predetermined protocol. In an embodiment, the protocol may be a standardized protocol. For example, coded information 222 may be a QR Code. The protocol is supported and used by an apparatus which creates the coded information comprising the security key. The protocol is also supported and used by the apparatus decoding the coded information for extracting the security key.

In embodiments, the first device 240 may include component(s) to capture and decode the coded information 222 (i.e., the security key). The component(s) may vary based on the coded information 222. In embodiments, the coded information 222 may be an image such as a QR Code displayed on, for example, a monitor of the second device 250. The first device 240 may capture image 222 via a built-in camera. An application installed in mobile phone 240 may then retrieve the coded information from the captured image 222 and decode the coded information to obtain the security key required for connecting to WAP 210.

In embodiments, the coded information 222 may be an audio clip which may be played, for example, through audio speakers of the second device 250. The first device 240 may capture the audio 222 via a built-in microphone. The first device 240 may then retrieve the coded information from the captured audio 222 and decode the coded information to obtain the security key.

In embodiments, the coded information 222 may be a video which may be displayed, for example, on a monitor of second device 250. The first device 240 may capture the video 222 via a built-in video camera. The first device 240 may then retrieve the coded information from the captured video 222 and decode the coded information to obtain the security key.

In embodiments, the second device 250 may be connected to the WAP 210 via a wireline or wireless connection. The settings of WAP 210 may be configured through the second device 250. For example, the security key required to connect to WAP 210 may be changed using the second device 250. In embodiments, the second device 250 may automatically generate coded information 222 representing the current security key to WAP 210 when the security key of WAP 210 is changed. The second device may display (if the coded information is an image or video) or play (if the coded information is audio) the coded information. For example, an application running on device 250 may display/play the coded information 222 when a user interacts with the application and indicates that he/she requires the coded information 222. In an embodiment, the second device 250 may require authentication to display/play the coded information 222.

Figure 4:
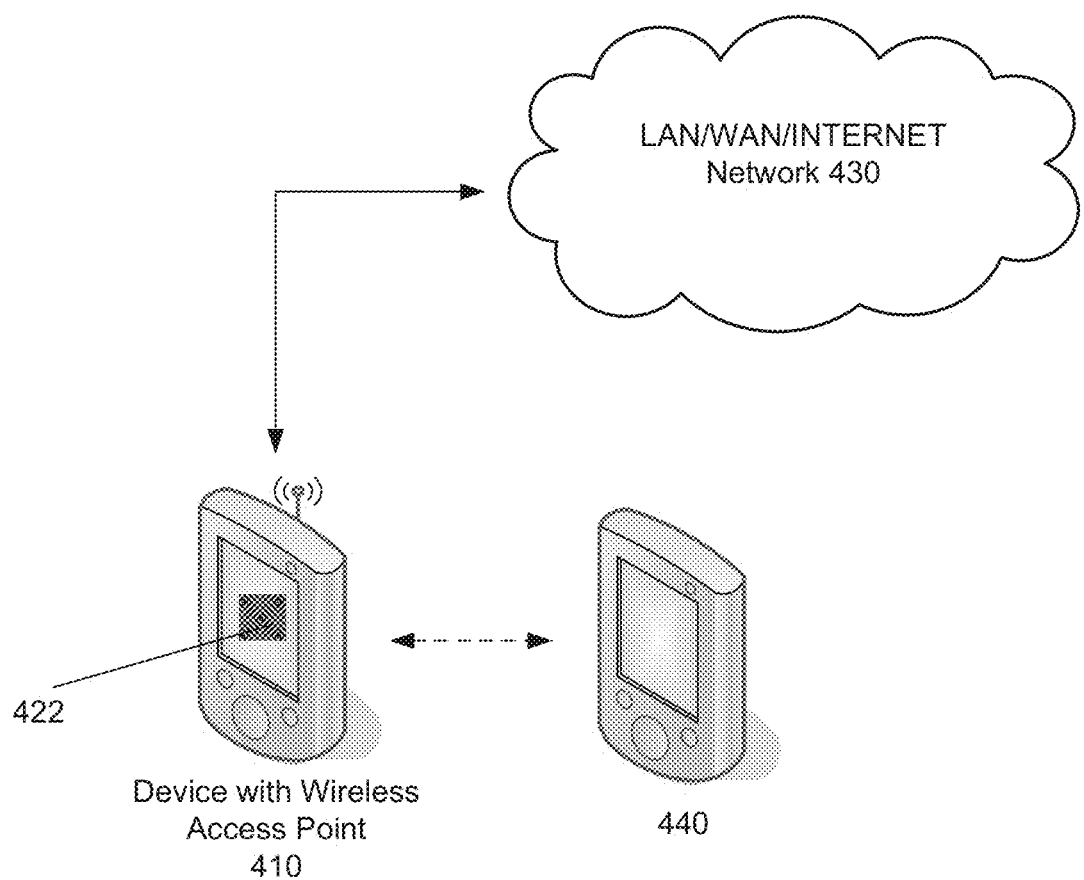
FIG. 4 illustrates a device connected to a WAP according to an embodiment.

In embodiments, the WAP 210 and the second device 250 may be integrated as shown in FIG. 4 (the device with a WAP 410). For example, the device with WAP 410 may be a mobile phone with tethering capabilities. Device 440 may connect to the device with WAP 410 to access the network 430. The device with WAP 410 may include built-in security to only allow authorized devices to connect to the device with WAP 410. In embodiments, the device 440 may acquire the security key required to connect to the device with WAP 410 from the device with WAP 410 itself. This may be accomplished through coded information 422, which the device 440 may decode to obtain the security key. The device 440 may then supply the security key to the device with WAP 410 in order to gain access to the network 430. The details of capturing the coded information 422, decoding the information, and connecting to the WAP of device 410 have been previously explained in the discussion pertaining to FIG. 2.

Figure 3:
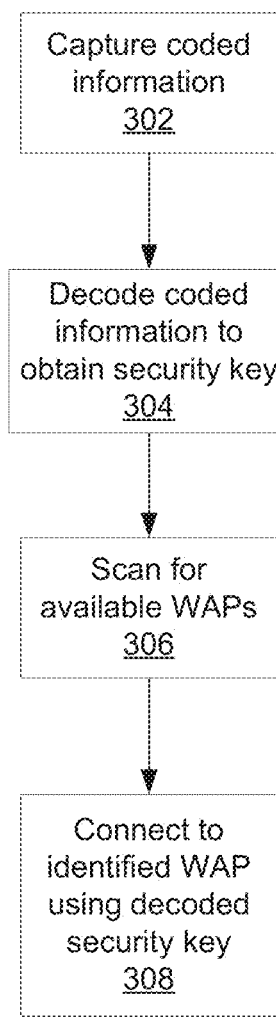
FIG. 3 is a flow diagram illustrating a process for connecting to a WAP according to an embodiment.

FIG. 3 is a flow diagram illustrating a process for connecting to a WAP according to an embodiment. A device, such as a mobile phone, may capture coded information which includes a security key to connect to a particular WAP (box 302). As explained with respect to FIGS. 1 and 2, there are different sources from which the coded information may be captured (for example, from a configuration sheet or another device). The coded information may be decoded by the device to obtain the security key required for connecting to the particular WAP (box 304). The device may scan for available WAPs visible to the device (box 306). Once the particular WAP to connect to is identified, the device may connect to the particular WAP (box 308).

In embodiments, in addition to the security key, the coded information may further include an identifier indicating the particular WAP so that the user does not have to manually enter (or remember) the name of the WAP. Thus, the device connecting to the WAP may automatically do so without much manual intervention (i.e., the user may not have to indicate to the device which WAP he/she is trying to connect to). Thus, in an embodiment, step 306 may be skipped. In embodiments, including the identifier indicating the specific WAP can be useful in instances in which the specific WAP is hidden. For example, a hidden WAP cannot be seen by device(s) scanning for all available WAPs in the vicinity, but rather the device needs to know the exact identifier of the WAP, such as the name of the WAP, in order to connect to it.

In embodiments, some of the steps in FIG. 3 may be manually initiated by a user. For example, the device may display the decoded security key to the user, and the user may have to copy and paste the decoded security key to another application in the device which interfaces with the WAP. In embodiments, the user may have to initiate scanning for WAPs on the device to identify the available WAPs and pick the particular WAP which the user wants the device to connect to.

In embodiments, the steps shown in FIG. 3 may be performed in a different order and/or some steps may be performed in parallel. For example, in an embodiment, decoding the coded information to obtain the security key (box 304) may be performed in parallel with scanning for available WAPs (box 306). In embodiments, scanning for available WAPs (box 306) may be performed prior to capturing the coded information (box 302).

In embodiments, WAPs may incorporate any type of wireless security protocol including Wi-Fi Protected Access (WPA), Wi-Fi Protected Access II (WPA2), and Wired Equivalent Privacy (WEP).

Figure 5:
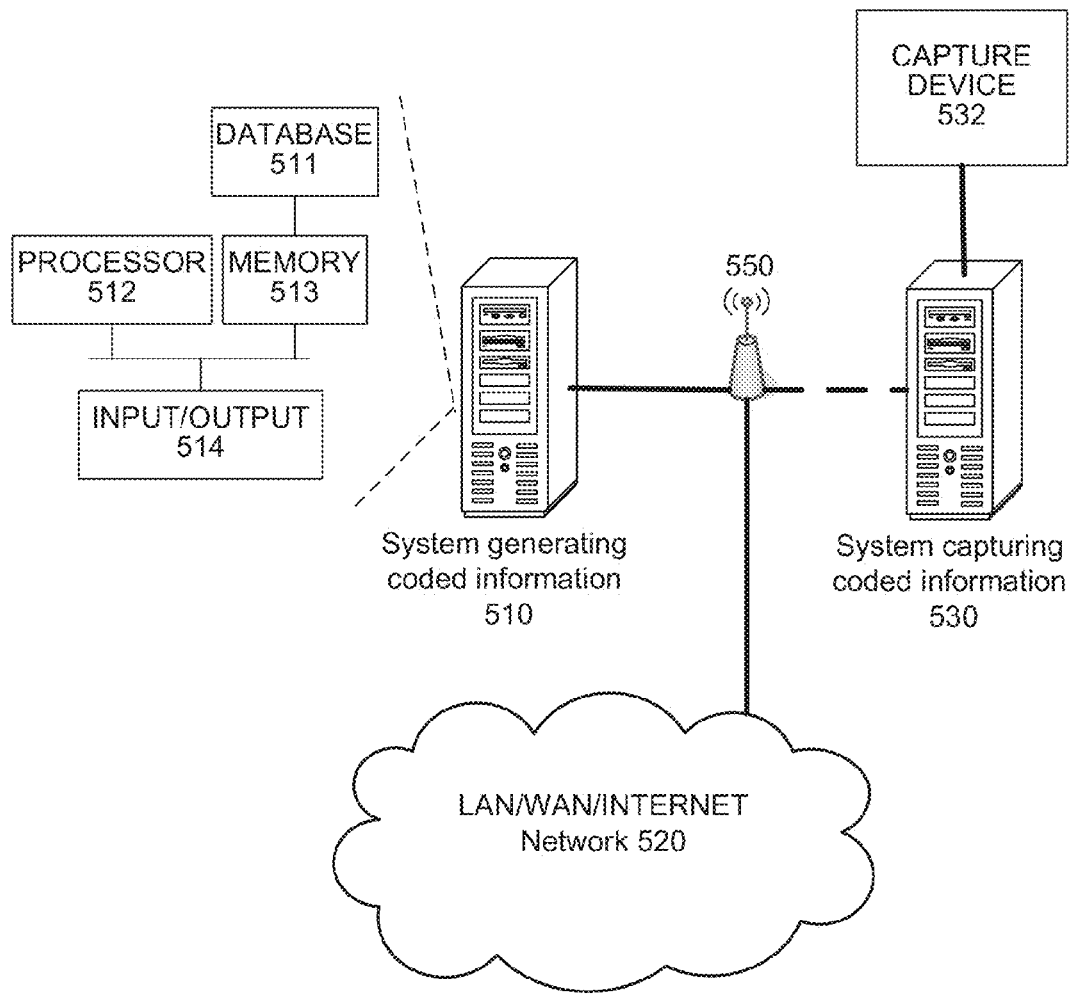
FIG. 5 shows an exemplary architecture in an embodiment.

FIG. 5 shows an exemplary architecture in an embodiment of the invention. The system generating coded information 510 may be coupled to a network 520 and to WAP 550. The system generating coded information 510 may include a desktop computer, laptop computer, tablet PC, client computer, mobile phone, central computer in a vehicle, and/or any other computer.

In embodiments, a system capturing coded information 530 may include a capture device 532 to capture the coded information. The capture devide 532 may include a still camera, a video camera, a barcode scanner, and/or a microphone. The system capturing coded information 530 may include hardware and/or software to capture and/or decode coded information.

Each of the systems 510, 530 in FIG. 5 may include a processing device 512, memory 513, a database 511, and an input/output interface 514, all of which may be interconnected via a system bus. The output interface 514 may include a computer monitor, a tablet PC screen, a mobile phone screen, and any other displays. In various embodiments, each of the systems 510, 530 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

In embodiments, memory 513 may contain different components for retrieving, presenting, changing, and saving data. Memory 513 may include a variety of memory devices, for example, Dynamic Random Access Memory (DRAM), Static RAM (SRAM), flash memory, cache memory, and other memory devices. Additionally, for example, memory 513 and processing device(s) 512 may be distributed across several different computers that collectively comprise a system.

Database 511 may include any type of data storage adapted to searching and retrieval. The database 511 may include SAP database (SAP DB), Informix, Oracle, DB2, Sybase, and other such database systems.

Processing device 512 may perform computation and control functions of a system and comprises a suitable central processing unit (CPU). Processing device 512 may comprise a single integrated circuit, such as a microprocessing device, or may comprise any suitable number of integrated circuit devices and/or circuit boards working in cooperation to accomplish the functions of a processing device. Processing device 512 may execute computer programs, such as object-oriented computer programs, within memory 513.

In FIGS. 1 to 5 devices are illustrated as smart phones and desktop computers for discussion purposes, but a person having ordinary skill in the art will appreciate that the principles of the present invention are not so limited. Embodiments of the present invention find application with devices including personal computers (both desktop and laptop computers), tablet computers, handheld computing devices, computer servers, media players, e-book readers, and/or dedicated video conferencing equipment.

In embodiments, the coded information is generated by supplying at least one image, audio clip, text, or video together with a security key as input to a steganographic algorithm. The steganographic algorithm incorporates the security key into the at least one image, audio clip, text, or video in such a way that the existence of the security key is hidden to a human observer. For example, the security key may be a hidden watermark within an image or video. Another example is a melody incorporated into a musical composition. When played through an audio output of an electronic device such as, for example, a speaker of a computer, a human listener may find it difficult to discern the melody as being anything besides a part of the original composition. However, a device with knowledge of the steganographic algorithm is able to separate the security key from the rest of the coded information. Thus, an advantage of using steganographically encoded information as the coded information is that the purpose of the coded information (providing a security key for connecting to a wireless access point) is hidden from unauthorized persons.

In embodiments, the security key is steganographically encoded so as to be hidden within encoded information that is by itself seemingly important. For example, the security key may be hidden within a dummy QR code that does not in itself provide access to the wireless access point. In this manner, the seemingly important information can serve to distract unauthorized users away from determining the correct method of obtaining the security key.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, some of the described embodiments may include software and hardware, but some systems and methods consistent with the present invention may be implemented in software or hardware alone. Additionally, although aspects of the present invention are described as being stored in memory, this may include other computer readable media, such as secondary storage devices, for example, solid state drives, or DVD ROM; the Internet or other propagation medium; or other forms of RAM or ROM.

I claim:

1. A computer-implemented method to connect a first device wirelessly to a network comprising:
    at the first device, capturing coded information, wherein the coded information includes a security key and an identifier to connect to a wireless access point hidden from being seen during scanning for available wireless access points, wherein the coded information is at least one of an image, an audio clip, and a video, and wherein the at least one of an image, and audio clip, and a video, is steganographically encoded using a steganographic algorithm that hides the security key and the identifier within the coded information such that the coded information must be decoded using a corresponding steganographic decoding algorithm in order to recover the security key and the identifier;
    decoding the coded information by applying the corresponding steganographic decoding algorithm to recover the security key and the identifier; and
    using the recovered security key and the recovered identifier to connect the first device to the hidden wireless access point.

2. The method of claim 1, wherein the coded information is captured from one of a display of an electronic device and an audio output of the electronic device.

3. The method of claim 2, wherein the electronic device includes the hidden wireless access point.

4. The method of claim 1, wherein the coded information is at least two of the image, the audio clip, a text, and the video.

5. The method of claim 1, wherein the hidden wireless access point is secured by one of Wi-Fi Protected Access, Wi-Fi Protected Access II, and Wired Equivalent Privacy.

6. The method of claim 1, wherein the coded information is an audio clip captured from an audio output of an electronic device.

7. A computer-implemented method comprising:
    coding information including a security key and an identifier, wherein the identifier is required to locate a wireless access point hidden from being seen during scanning for available wireless access points, the security key is required to connect to the hidden wireless access point and the coded information is at least one of an image, an audio clip, and a video, and wherein the coding is performed using a steganographic algorithm that hides the security key and the identifier within the coded information such that the coded information must be decoded using a corresponding steganographic decoding algorithm in order to recover the security key and the identifier; and
    at least one of a) displaying the coded information on a display of an electronic device and b) playing the coded information via at least an audio speaker of the electronic device,
    wherein the coded information is decoded by applying the corresponding steganographic decoding algorithm to recover the security key and the identifier, and the recovered security key and the recovered identifier are used to connect to the hidden wireless access point.

8. An apparatus comprising:
    at least one of a camera and a microphone to capture coded information, wherein the coded information includes a security key and an identifier to connect to a wireless access point hidden from being seen during scanning for available wireless access points, and the coded information is at least one of an image, an audio clip, and a video, and wherein the at least one of an image, an audio clip, and a video is steganographically encoded using a steganographic algorithm that hides the security key and the identifier within the coded information such that the coded information must be decoded using a corresponding steganographic decoding algorithm in order to recover the security key and the identifier;
    a processor for executing computer instructions, the processor configured to:
        decode the coded information by applying the corresponding steganographic decoding algorithm to recover the security key and the identifier, and
        use the recovered security key and the recovered identifier to connect to the hidden wireless access point.

9. The apparatus of claim 8, wherein the coded information is an image captured from a display of an electronic device.

10. The apparatus of claim 9, wherein the electronic device includes the hidden wireless access point.

11. The apparatus of claim 8, wherein the hidden wireless access point is secured by one of Wi-Fi Protected Access, Wi-Fi Protected Access II, and Wired Equivalent Privacy.

12. The apparatus of claim 8, wherein the coded information is an audio clip captured from an audio output of an electronic device.

13. An apparatus comprising:
    a processor for executing computer instructions, the processor configured to code information including a security key and an identifier, wherein the security key and the identifier are required to connect to a wireless access point hidden from being seen during scanning for available wireless access points, and the coded information is at least one of an image, an audio clip, and a video, and wherein the at least one of an image, an audio clip, and a video is steganographically encoded using a steganographic algorithm that hides the security key and the identifier within the coded information such that the coded information must be decoded using a corresponding steganographic decoding algorithm in order to recover the security key and the identifier; and at least one of a) a display to display the coded information and b) at least an audio speaker to play the coded information, wherein the coded information is decoded by applying the corresponding steganographic decoding algorithm to recover the security key and the identifier, and the recovered security key and the recovered identifier are used to connect to the hidden wireless access point.

14. A non-transitory computer-readable medium storing computer executable instructions which, when executed, implement operations comprising:

capturing coded information, wherein the coded information includes a security key and an identifier to connect to a wireless access point hidden from being seen during scanning for available wireless access points, and the coded information is at least one of an image, an audio clip, and a video, and wherein the at least one of an image, an audio clip, and a video is steganographically encoded using a steganographic algorithm that hides the security key and the identifier within the coded information such that the coded information must be decoded using a corresponding steganographic decoding algorithm in order to recover the security key and the identifier;

decoding the coded information by applying the corresponding steganographic decoding algorithm to recover the security key and the identifier; and using the recovered security key and the recovered identifier to connect a device to the hidden wireless access point.

15. The computer-readable medium of claim 14, wherein the coded information is captured from one of a display of an electronic device and an audio output of the electronic device.

16. The computer-readable medium of claim 15, wherein the electronic device includes the hidden wireless access point.

17. The computer-readable medium of claim 14, wherein the coded information is an audio clip captured from an audio output of an electronic device.

* * * * *